US012050690B2

(12) United States Patent
Sivaswamy et al.

(10) Patent No.: US 12,050,690 B2
(45) Date of Patent: Jul. 30, 2024

(54) RUN-TIME COMMUNICATIONS PROTOCOL PARAMETER ADJUSTMENT IN CONTAINERIZED APPLICATIONS

(71) Applicant: International Business Machines Corporation, Armonk, NY (US)

(72) Inventors: Magesh Kumar Sivaswamy, Bangalore (IN); Rashmi Khanna, Bangalore (IN); Manesh Chandran Nambiar, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 545 days.

(21) Appl. No.: 17/208,439

(22) Filed: Mar. 22, 2021

(65) Prior Publication Data

US 2022/0300611 A1    Sep. 22, 2022

(51) Int. Cl.
*G06F 21/00* (2013.01)
*G06F 9/54* (2006.01)
*G06F 21/57* (2013.01)

(52) U.S. Cl.
CPC ............. *G06F 21/57* (2013.01); *G06F 9/54* (2013.01); *G06F 2221/034* (2013.01)

(58) Field of Classification Search
CPC ....... G06F 2221/034; G06F 9/54; G06F 21/57
See application file for complete search history.

(56) References Cited

U.S. PATENT DOCUMENTS

| | | | |
|---|---|---|---|
| 6,907,531 B1 | 6/2005 | Dodd et al. | |
| 8,055,617 B2 | 11/2011 | Hindawi et al. | |
| 8,074,277 B2 | 12/2011 | Freund | |
| 8,407,687 B2 | 3/2013 | Moshir et al. | |
| 9,521,115 B1 | 12/2016 | Woolward | |
| 9,766,920 B2* | 9/2017 | Klee | G06F 3/0683 |
| 10,198,562 B2 | 2/2019 | Boudreau et al. | |
| 10,404,474 B1 | 9/2019 | Caceres et al. | |
| 10,601,807 B2 | 3/2020 | Sweet et al. | |
| 11,032,739 B2* | 6/2021 | Ly | H04W 28/06 |
| 11,573,971 B1* | 2/2023 | Cannon | G06F 16/252 |

(Continued)

FOREIGN PATENT DOCUMENTS

| | | |
|---|---|---|
| CN | 111552496 A | 8/2020 |
| CN | 112506617 A | 3/2021 |

(Continued)

OTHER PUBLICATIONS

MDN Contributors, X-XSS-Protection, Jan. 9, 2021, https://developer.mozilla.org/en-US/docs/Web/HTTP/Headers/X-XSS-Protection.

(Continued)

*Primary Examiner* — Josnel Jeudy
(74) *Attorney, Agent, or Firm* — Garg Law Firm, PLLC; Rakesh Garg; Edward Wixted

(57) ABSTRACT

At a sidecar portion sharing a container with a first application portion, metadata describing a modification to a communications protocol is received. At the sidecar portion, a communication of the first application portion to a second application outside the container is received. The modifying is performed according to the metadata. The modified communication is transmitted to the second application.

20 Claims, 9 Drawing Sheets

(56) References Cited

U.S. PATENT DOCUMENTS

| | | | |
|---|---|---|---|
| 11,695,988 B2* | 7/2023 | Taylor | H04N 21/858 725/32 |
| 2002/0051065 A1* | 5/2002 | Takahashi | H04N 5/76 386/E5.072 |
| 2004/0052191 A1* | 3/2004 | Sako | G11B 27/105 386/E5.004 |
| 2005/0108518 A1 | 5/2005 | Pandya | |
| 2011/0302566 A1 | 12/2011 | Abadi et al. | |
| 2013/0054772 A1* | 2/2013 | Sung | G06Q 30/0261 709/223 |
| 2016/0315974 A1 | 10/2016 | Viswanathan et al. | |
| 2017/0223043 A1 | 8/2017 | Munoz et al. | |
| 2017/0300697 A1 | 10/2017 | Iyer et al. | |
| 2017/0366573 A1 | 12/2017 | Zaw | |
| 2018/0027009 A1 | 1/2018 | Santos et al. | |
| 2019/0278928 A1 | 9/2019 | Rungta et al. | |
| 2019/0391834 A1 | 12/2019 | Mullen et al. | |
| 2019/0391841 A1 | 12/2019 | Mullen et al. | |
| 2019/0394219 A1* | 12/2019 | Huang | G06F 9/455 |
| 2019/0394223 A1 | 12/2019 | Shekyan et al. | |
| 2020/0329114 A1 | 10/2020 | Bahl et al. | |
| 2021/0334547 A1* | 10/2021 | Cohen-Tidhar | G06V 10/82 |

FOREIGN PATENT DOCUMENTS

| | | | | |
|---|---|---|---|---|
| DE | 102015015628 A1 * | 6/2017 | | H04W 84/18 |
| EP | 1891520 B1 | 9/2017 | | |
| KR | 101691117 B1 | 12/2016 | | |

OTHER PUBLICATIONS

Banach, Using Content Security Policy (CSP) to Secure Web Applications, Mar. 27, 2020, https://www.netsparker.com/blog/web-security/content-security-policy/.

Istio, Virtual Service, 2021, https://istio.io/docs/reference/config/networking/virtual-service/#Headers-HeaderOperations.

Jackson, Hardening Your HTTP Security Headers, Jun. 19, 2019, https://www.keycdn.com/blog/http-security-headers.

Albeniz et al., Http Security Headers, Sep. 2018, https://www.netsparker.com/whitepaper-http-security-headers/.

Wiki, OWASP Secure Headers Project, 2021, https://wiki.owasp.org/index.php/OWASP_Secure_Headers_Project#ta.

Nadalin, Secure your web application with these HTTP headers, Aug. 23, 2018, https://odino.org/secure-your-web-application-with-these-http-headers/.

Rajappa, An Introduction to HTTP Response Headers for Security, Mar. 23, 2018, https://securityintelligence.com/an-introduction-to-http-response-headers-for-security/.

Istio, What is Istio?, 2021, https://istio.io/docs/concepts/what-is-istio/.

Istio, Sidecars, 2021, https://istio.io/docs/concepts/traffic-management/#sidecars.

Istio, Egress, 2021, https://istio.io/latest/docs/tasks/traffic-management/egress/.

Kosaka, How to Secure Containers in a Service Mesh such as Istio and Linkerd2, Feb. 12, 2019, https://blog.neuvector.com/article/secure-containers-istio-service-mesh.

Application No. 2022245632, Examination report No. 1 for standard patent application, Jan. 23, 2024.

International Searching Authority, PCT/CN2022/078149, May 19, 2022.

* cited by examiner

RUN-TIME COMMUNICATIONS PROTOCOL PARAMETER ADJUSTMENT IN CONTAINERIZED APPLICATIONS

BACKGROUND

The present invention relates generally to a method, system, and computer program product for containerized application management. More particularly, the present invention relates to a method, system, and computer program product for run-time communications protocol parameter adjustment in containerized applications.

Many software applications execute in application containers, or containers, and hence are called containerized applications. A container is a package for an application that includes executable code of the application and software dependencies such as the libraries and application program interfaces (APIs) used to interface hardware and other software. A container also includes a specification of the hardware requirements needed to run the software in the container, for example the processor, memory, network, and storage needs for the container. Because each container is an independent, self-contained unit, containers can easily be deployed on systems with differing capabilities, stored in a repository for ease of deployment, and deployed and removed independently in response to changing processing needs. A container manager is software that manages the creation, deployment, scaling, availability, and destruction of containers. Container management software helps optimize how and where to run containers as well as which systems to put them on.

Large, complex software applications are often implemented as sets of smaller applications, also called microservices or services. Each microservice performs a specific task and is packaged into a separate container. Modularizing a large application in this manner allows for microservices to be implemented, updated, and deployed individually, without affecting other portions of the overall application. As well, because containers are independent of each other, different modules of an application can be implemented using different software libraries, different versions of a library, or different software languages. Multiple instances of a container can execute independently on the same system, and to improve application availability services are often scaled by distributing multiple instances of a container across a group of systems.

Application software within a container often requires a set of functions that is not container-specific. For example, regardless of their particular functionality, containers communicate with entities, such as other containers, applications, and hardware, outside a container. Thus, to separate a particular service's functionality from a standard set of functionalities used by containerized services, a service is often implemented divided into two portions: a container's application portion includes software code implementing a service's specific functionality, and a container's sidecar portion includes software code implementing the standard set of functionalities used by containerized services. For example, communications functionality with outside entities is often implemented in a sidecar portion.

A communication protocol defines the rules, syntax, semantics and synchronization of communication and possible error recovery methods by which two or more entities transmit information to each other. Many protocols use a format in which one entity (e.g. an application, or the hardware on which an application is executing), sends a request for some data and a second entity responds to the request. Under many protocols (e.g. the Hypertext Transfer Protocol (HTTP)), request and response messages include a header section or portion. Header fields are components of the header section of request and response messages and define the operating parameters of a particular transaction using the protocol. For example, some header fields control the type of encoding used on the data being sent, or indicate that particular server behaviors are required by the client sending the message. An HTTP header consists of its case-insensitive name followed by a colon (:), then by one or more settings. For example, the Expect-CT HTTP header uses the syntax: Expect-CT: report-url="<url>", enforce, max-age=<age>, where <url> denotes a Uniform Resource Locator (URL) identifying an address within a network such as the Internet and <age> denotes a number of seconds. As another example, the X-Frame-Options HTTP header has possible settings of DENY, SAMEORIGIN, and ALLOW-FROM <url>. As a third example, the Public-Key-Pins HTTP header uses the syntax: Public-Key-Pins: pin-sha256="<pin-value>"; max-age=<expire-time>; includeSubDomains; report-url="<url>", where <pin-value> denotes a value of a public cryptographic key, <expire-time> denotes an expiration time in seconds, and <url> denotes a URL. Other non-HTTP protocols also use headers in similar formats.

SUMMARY

The illustrative embodiments provide a method, system, and computer program product. An embodiment includes a method that receives, at a sidecar portion sharing a container with a first application portion, metadata describing a modification to a communications protocol. An embodiment modifies, at the sidecar portion, a communication of the first application portion to a second application outside the container, the modifying performed according to the metadata. An embodiment transmits, to the second application, the modified communication.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
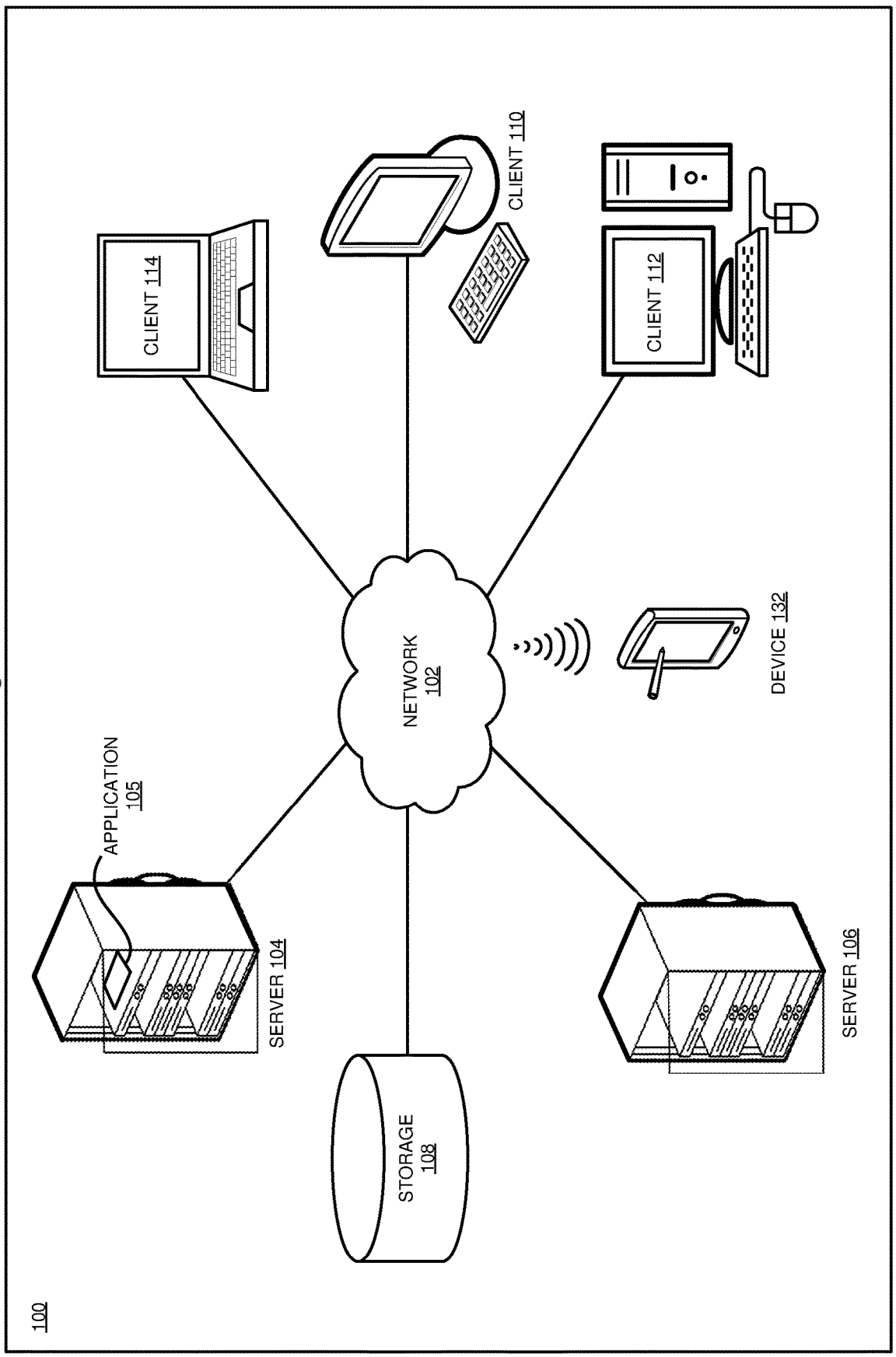
FIG. 1 depicts a block diagram of a network of data processing systems in which illustrative embodiments may be implemented.

The illustrative embodiments recognize that, because both authorized and unauthorized users use communication protocols to communicate, outdated or misconfigured communication protocols often expose security vulnerabilities that can be exploited for unauthorized uses. Containerized applications, because they communicate with each other and other entities, are particularly exposed to the security vulnerabilities caused by outdated or misconfigured communication protocols. Thus, maintaining communication protocols in a correctly configured state appropriate to a particular application execution environment, in response to both new versions of a protocol and newly-recognized vulnerabilities, is an important part of system and application security management.

The illustrative embodiments also recognize that, because communication protocols are implemented within application software, the only methods of determining a current configuration of an application's communication protocol settings or enforcing consistency among a group of containerized applications are to inspect an application's source code or individual messages. In addition, current methods of updating containerized application communication protocol usage or settings require individually updating each application, generating executable code incorporating the updates, and deploying the resulting binaries deployed wherever each container. These methods are error-prone, because they must be performed consistently across a group of containers or all deployed containers, container developers are often unfamiliar with communication protocol details, and every software update runs the risk of introducing additional bugs and incompatibilities between containers. These methods are also difficult to automate. In addition, updating and redeploying all the services in a large, distributed application is time-consuming, lengthening exposure time to a security vulnerability that could be actively being exploited. Thus, the illustrative embodiments recognize that there is an unmet need for an improved method of updating containerized application communication protocol usage or settings that does not require altering containerized application source code or redeploying containers after an update.

The illustrative embodiments recognize that the presently available tools or solutions do not address these needs or provide adequate solutions for these needs. The illustrative embodiments used to describe the invention generally address and solve the above-described problems and other problems related to run-time communications protocol parameter adjustment in containerized applications.

An embodiment can be implemented as a software application. The application implementing an embodiment can be configured as a modification of an existing sidecar portion of an application within a container, as a separate application that operates in conjunction with an existing sidecar portion of an application within a container, a standalone application, or some combination thereof.

Particularly, some illustrative embodiments provide a method that receives metadata describing a modification to a communications protocol at a sidecar portion sharing a container with a first application portion, modifies, according to the metadata, a communication of the first application portion to a second application outside the container, and transmits the modified communication to the second application.

An embodiment is implemented within application functionality that implements software for communicating between a containerized application and an entity outside the containerized application's container. Application functionality that implements software for communicating between applications sends and receives data between computer systems over a communications network connecting the systems. In a container with an application portion including software code implementing a service's specific functionality and a sidecar portion implementing communication functionality, an embodiment is implemented within the sidecar portion.

An embodiment receives metadata describing a modification to a communications protocol. If the communication protocol includes header fields, the metadata specifies whether a particular header setting is to be changed, and if so what the header setting should be changed to. If the communication protocol includes header fields, the metadata also specifies whether a particular header is to be removed or replaced with another header, and any settings associated with the new header.

As a non-limiting example, the Public-Key-Pins HTTP header is used to associate a specific cryptographic public key with a certain web server to decrease the risk of man-in-the-middle attacks using forged security certificate. However, because use of this header is being phased out, a system administrator wishes to reconfigure all containerized applications currently deployed on systems being managed to use the Expect-CT HTTP header instead of the Public-Key-Pins header. The Expect-CT header allows a site to opt in to reporting and/or enforcement of Certificate Transparency requirements, which prevents the use of mis-issued security certificates for a site from going unnoticed. Thus, the administrator generates metadata specifying that the Public-Key-Pins header is to be updated to the Expect-CT header, and specifying appropriate settings for the Expect-CT header, and sends the metadata to an embodiment.

As another non-limiting example, suppose a system administrator wishes to reconfigure all containerized applications currently deployed on systems being managed to use a smaller maximum age setting than they may currently be using for the Expect-CT header. Thus, the administrator generates metadata specifying that when an application generates a message using the Expect-CT header, the max_age setting should be set to a particular numeric value, and sends the metadata to an embodiment.

As another non-limiting example, suppose a system administrator wishes to ensure that all containerized applications currently deployed on systems being managed specify a particular setting for the X-Frame-Options HTTP header, which specifies whether a browser is allowed to render a page in a frame or other object. Thus, the administrator generates metadata specifying that when an application generates a message, the X-Frame-Options header with the SAMEORIGIN setting should be included, and sends the metadata to an embodiment.

An embodiment receives a communication from a portion of a containerized application to an entity outside the containerized application's container. One embodiment receives the communication at a sidecar portion implementing communication functionality.

An embodiment inspects the communication and determines whether a portion of the communication should be modified according to the metadata. If the communication includes header fields, an embodiment inspects the header fields of the communication and determines, using the metadata, whether one or more headers, or header settings, should be modified, removed, or replaced.

If a portion of the communication should be modified, an embodiment modifies the communication according to the metadata and transmits the modified communication to the original receiver. One embodiment converts metadata to specific communication modifications at a sidecar portion within a container. Another embodiment converts metadata to specific communication modifications at an application portion implementing communications functionality within a container. Another embodiment converts metadata to specific communication modifications at a container manager, then sends the modifications to a containerized application for implementation in a specific communication.

Thus, if for example metadata specifies that the Public-Key-Pins header is to be updated to the Expect-CT header, and specifies appropriate settings for the Expect-CT header, an embodiment modifies a communication including the Public-Key-Pins header, replacing the Public-Key-Pins header with the Expect-CT header and specified settings, and transmits the modified communication. As another example, if metadata specifies that when an application generates a message using the Expect-CT header, the max_age setting should be set to a particular numeric value, an embodiment modifies a communication including the Expect-CT header to use the specified value for the max_age setting. As another example, if metadata specifies that when an application generates a message, the X-Frame-Options header with the SAMEORIGIN setting should be included, an embodiment modifies a communication to include the X-Frame-Options header (if not already present) and ensures the X-Frame-Options header specifies the SAMEORIGIN setting.

In one implementation, a human system administrator generates metadata and uses a container manager to send the metadata to a container. In another implementation, a security policy specifies communication protocol settings. A container manager generates metadata automatically from the security policy and sends the metadata to a container for implementation of the security policy within the container's communication protocol. In another implementation, protocol updates repairing reported security vulnerabilities (e.g. that a particular setting should or should not be used, or that a particular protocol should be replaced by a more secure protocol setting) are transformed into metadata, then the metadata is sent to a container for implementation within the container's communication protocol.

Metadata can be specific to a particular container, or a group of containers, or the same for all containers a container manager manages. Thus, a container manager uses metadata to specify updated containerized application communication protocol usage or settings. In addition, the updates are performed at containerized application runtime, without altering application source code or redeploying containers after an update.

The manner of run-time communications protocol parameter adjustment in containerized applications described herein is unavailable in the presently available methods in the technological field of endeavor pertaining to container management. A method of an embodiment described herein, when implemented to execute on a device or data processing system, comprises substantial advancement of the functionality of that device or data processing system in receiving metadata describing a modification to a communications protocol at a sidecar portion sharing a container with a first application portion, modifying, according to the metadata, a communication of the first application portion to a second application outside the container, and transmitting the modified communication to the second application.

The illustrative embodiments are described with respect to certain types of containers, sidecar portions, application portions, container managers, communications, communication protocols, headers, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
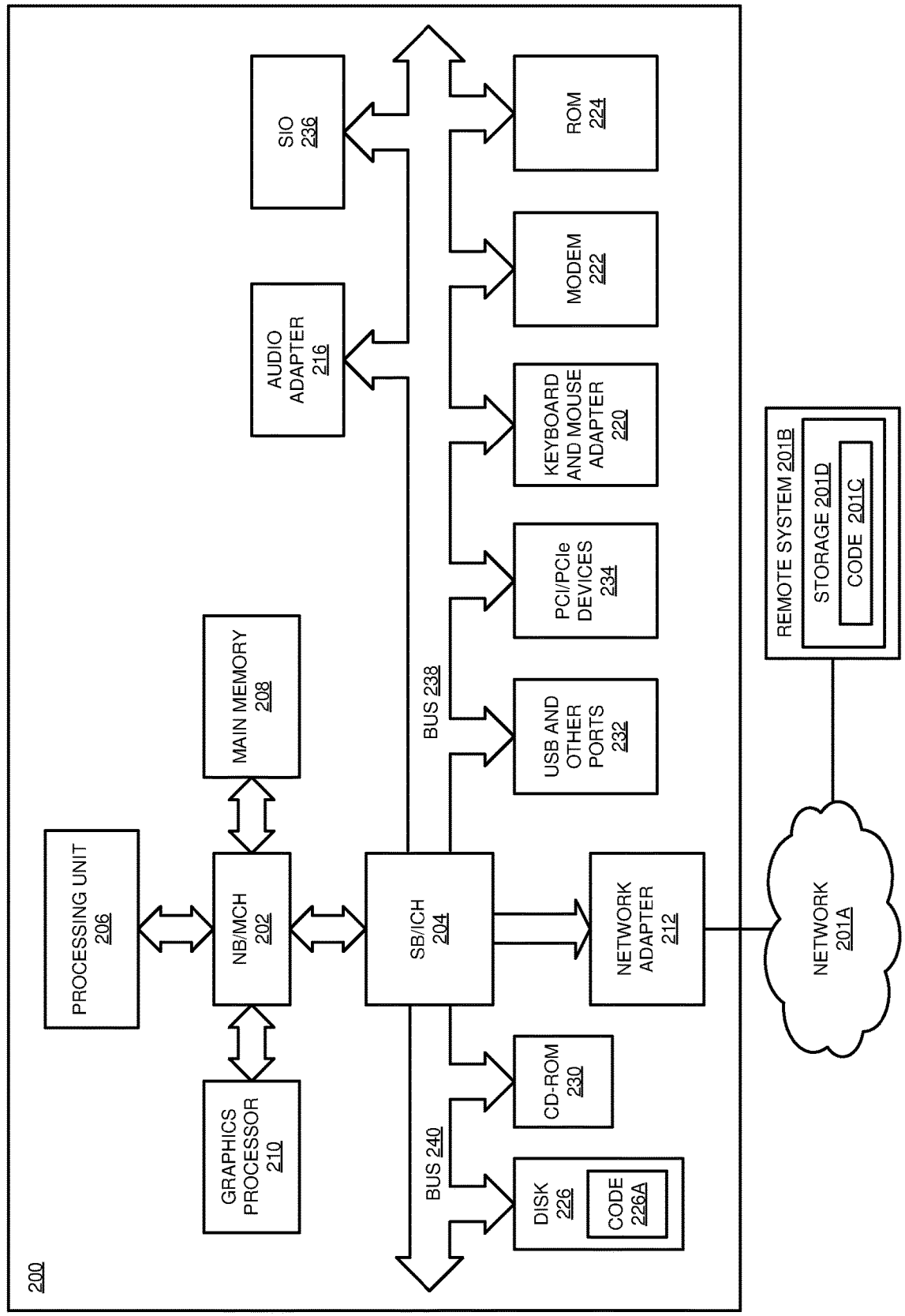
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. For example, a container, including an application portion and sidecar portion, executes in server 104 and communicates over network 102 with another container executing in server 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
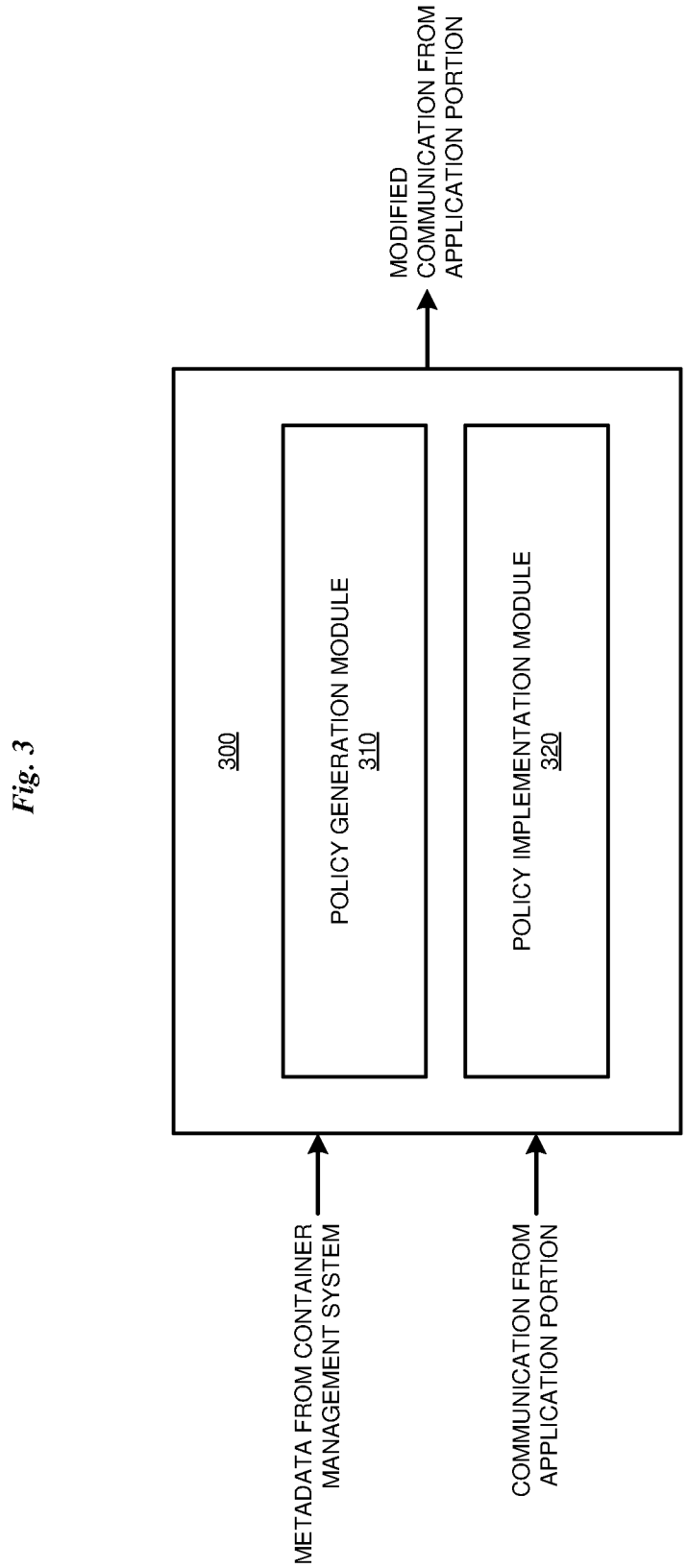
FIG. 3 depicts a block diagram of an example configuration for run-time communications protocol parameter adjustment in containerized applications in accordance with an illustrative embodiment.

With reference to FIG. 3, this figure depicts a block diagram of an example configuration for run-time communications protocol parameter adjustment in containerized applications in accordance with an illustrative embodiment. Application 300 is an example of application 105 in FIG. 1 and executes in any of servers 104 and 106, clients 110, 112, and 114, and device 132 in FIG. 1.

Policy generation module 310 receives metadata describing a modification to a communications protocol. If the communication protocol includes header fields, the metadata specifies whether a particular header setting is to be changed, and if so what the header setting should be changed to. If the communication protocol includes header fields, the metadata also specifies whether a particular header is to be removed or replaced with another header, and any settings associated with the new header.

Policy implementation module 320 receives a communication from a portion of a containerized application to an entity outside the containerized application's container. One implementation of module 320 receives the communication at a sidecar portion implementing communication functionality.

Module 320 inspects the communication and determines whether a portion of the communication should be modified according to the metadata. If the communication includes header fields, module 320 inspects the header fields of the communication and determines, using the metadata, whether one or more headers, or header settings, should be modified, removed, or replaced.

If a portion of the communication should be modified, module 320 modifies the communication according to the metadata and transmits the modified communication to the original receiver. One implementation of module 320 converts metadata to specific communication modifications at a sidecar portion within a container. Another implementation of module 320 converts metadata to specific communication modifications at an application portion implementing communications functionality within a container. Another implementation of module 320 converts metadata to specific communication modifications at a container manager, then sends the modifications to a containerized application for implementation in a specific communication.

Figure 4:
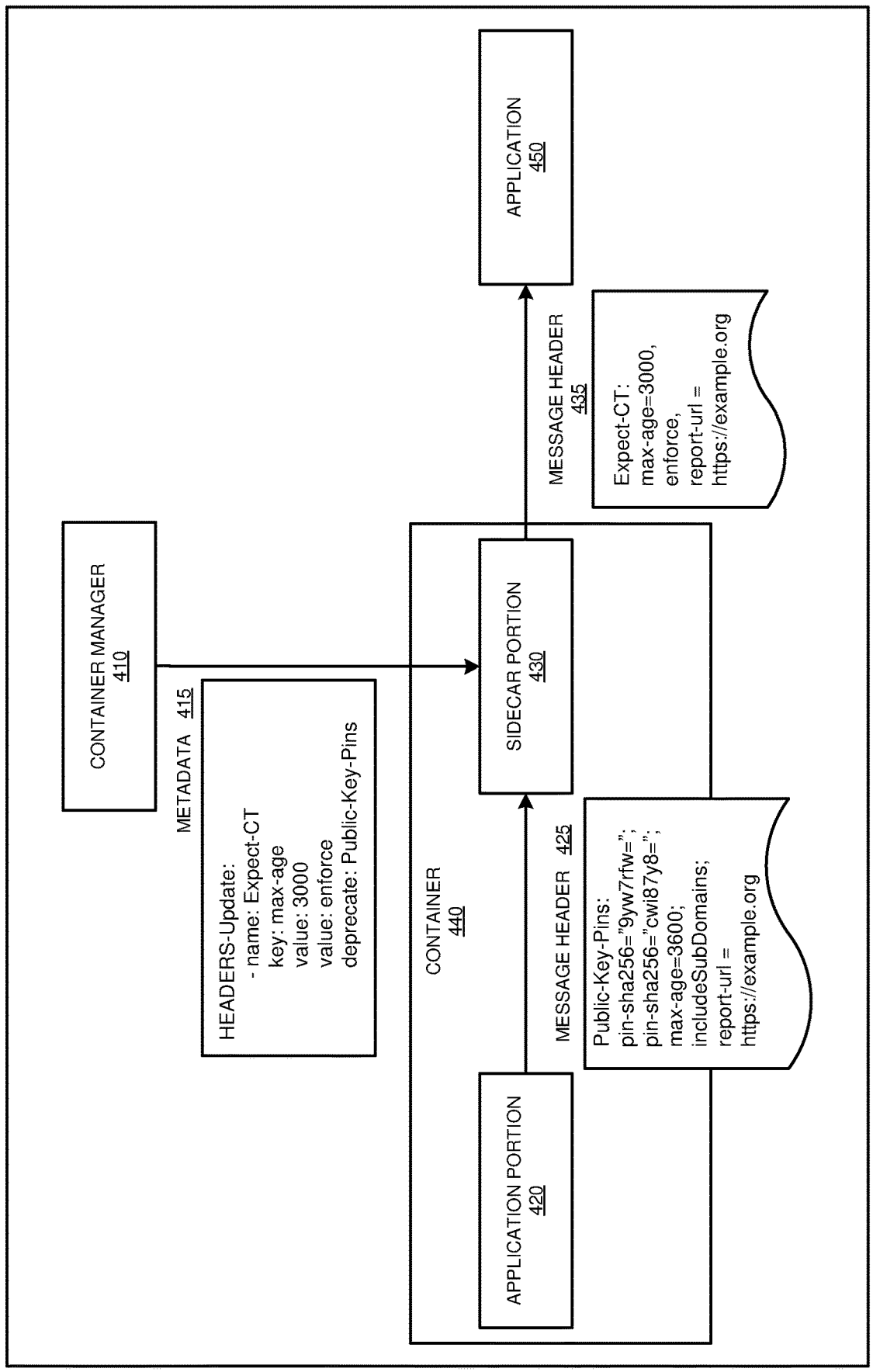
FIG. 4 depicts an example of run-time communications protocol parameter adjustment in containerized applications in accordance with an illustrative embodiment.

With reference to FIG. 4, this figure depicts an example of run-time communications protocol parameter adjustment in containerized applications in accordance with an illustrative embodiment. The example can be executed using application 300 in FIG. 3.

Container manager 410 manages container 440, which includes application portion 420 and sidecar portion 430. Application portion 420 implements a service's specific functionality, and sidecar portion 430 implements communication functionality for container 440.

Sidecar portion 430 receives metadata 415 from container manager 410. Metadata 415 specifies that the Public-Key-Pins header is to be updated to the Expect-CT header, and specifies appropriate settings for the Expect-CT header. As a result, when application portion 420 generates a communication including message header 425, which includes a Public-Key-Pins header, sidecar portion 430 replaces the Public-Key-Pins header with the Expect-CT header and specified settings. The result is shown in message header 435. Sidecar portion transmits the modified communication, including message header 435, to application 450, outside container 440.

Figure 5:
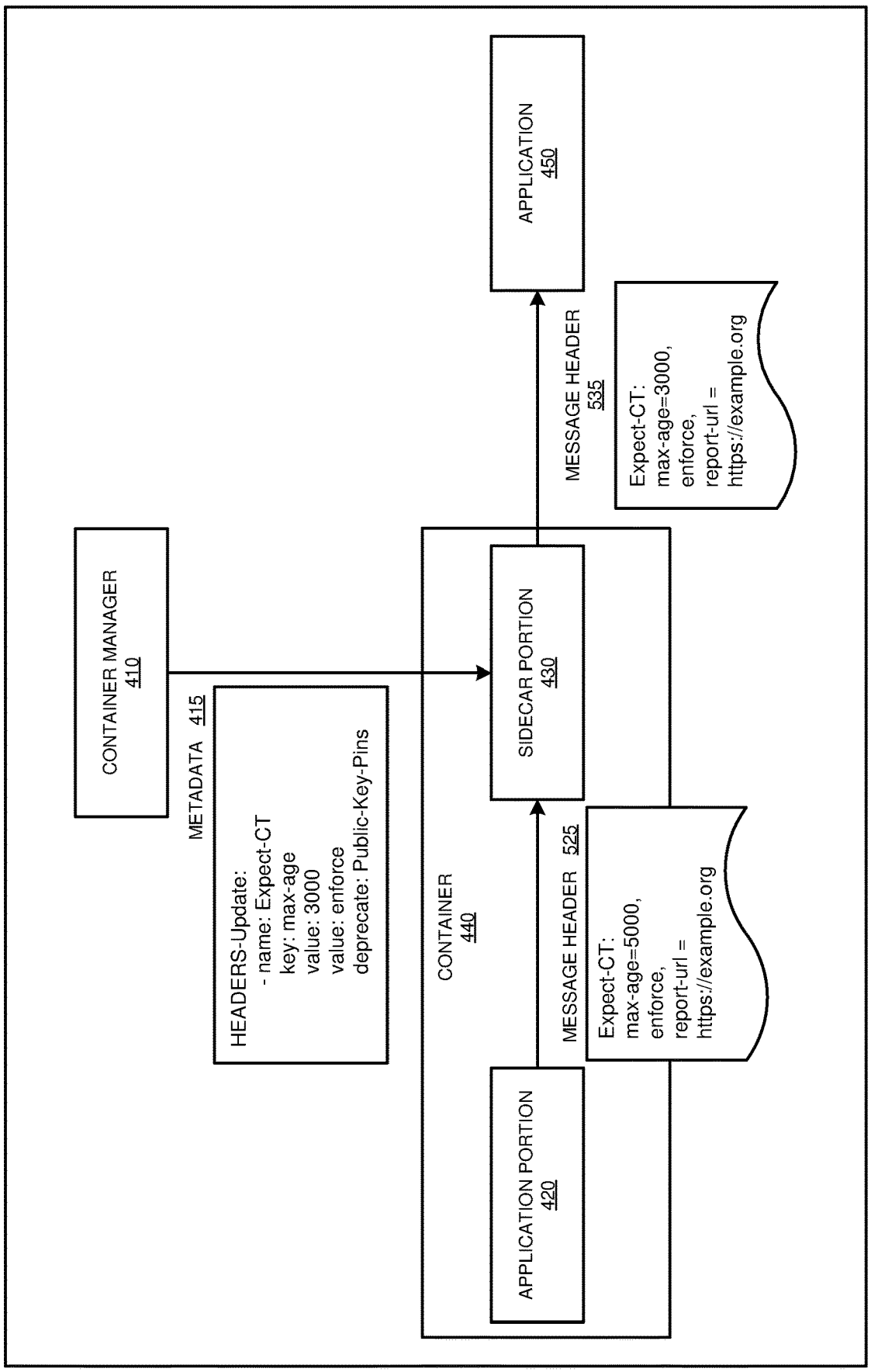
FIG. 5 depicts a continued example of run-time communications protocol parameter adjustment in containerized applications in accordance with an illustrative embodiment.

With reference to FIG. 5, this figure depicts a continued example of run-time communications protocol parameter adjustment in containerized applications in accordance with an illustrative embodiment. Container manager 410, application portion 420, sidecar portion 430, container 440, application 450, and metadata 415 are the same as container manager 410, application portion 420, sidecar portion 430, container 440, application 450, and metadata 415 in FIG. 4.

Sidecar portion 430 receives metadata 415 from container manager 410. Metadata 415 also specifies that when an application generates a message using the Expect-CT header, the max_age setting should be set to a particular numeric value, 3000. As a result, when application portion 420 generates a communication including message header 525, which includes an Expect-CT header with a max_age setting (5000) that does not match the value in metadata 415, sidecar portion 430 modifies the communication to use the specified value, 3000, for the max_age setting. The result is shown in message header 535. Sidecar portion transmits the modified communication, including message header 535, to application 450, outside container 440.

Figure 6:
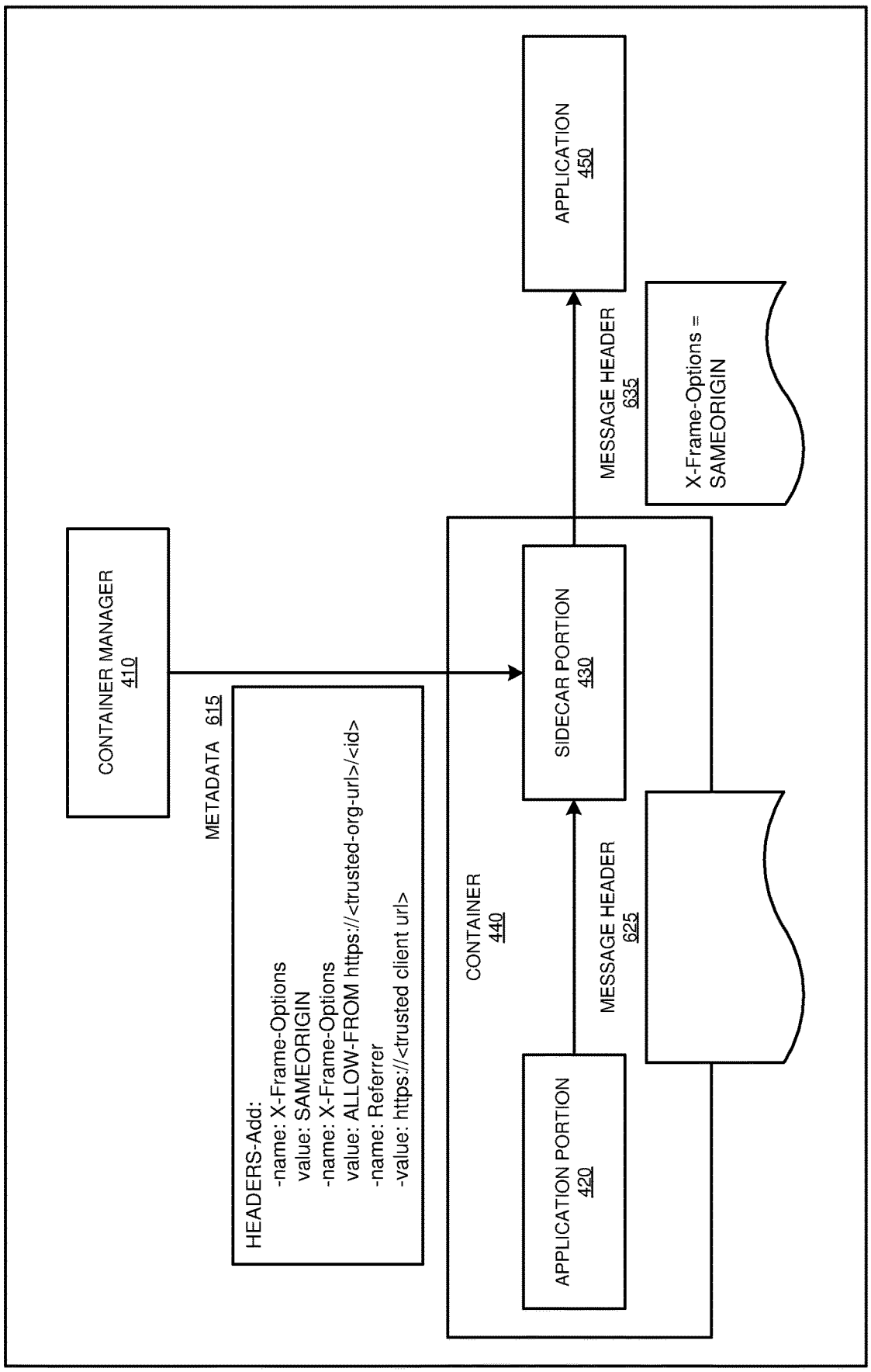
FIG. 6 depicts a continued example of run-time communications protocol parameter adjustment in containerized applications in accordance with an illustrative embodiment.

With reference to FIG. 6, this figure depicts a continued example of run-time communications protocol parameter adjustment in containerized applications in accordance with an illustrative embodiment. Container manager 410, application portion 420, sidecar portion 430, container 440, application 450, and metadata 415 are the same as container manager 410, application portion 420, sidecar portion 430, container 440, application 450, and metadata 415 in FIG. 4.

Sidecar portion 430 receives metadata 615 from container manager 410. Metadata 615 specifies that when an application generates a message, the X-Frame-Options header with the SAMEORIGIN setting should be included. As a result, when application portion 420 generates a communication including message header 625, which does not include an X-Frame-Options header, sidecar portion 430 modifies the communication to include the X-Frame-Options header and ensures the X-Frame-Options header specifies the SAMEORIGIN setting. The result is shown in message header 635. Sidecar portion transmits the modified communication, including message header 635, to application 450, outside container 440.

Figure 7:
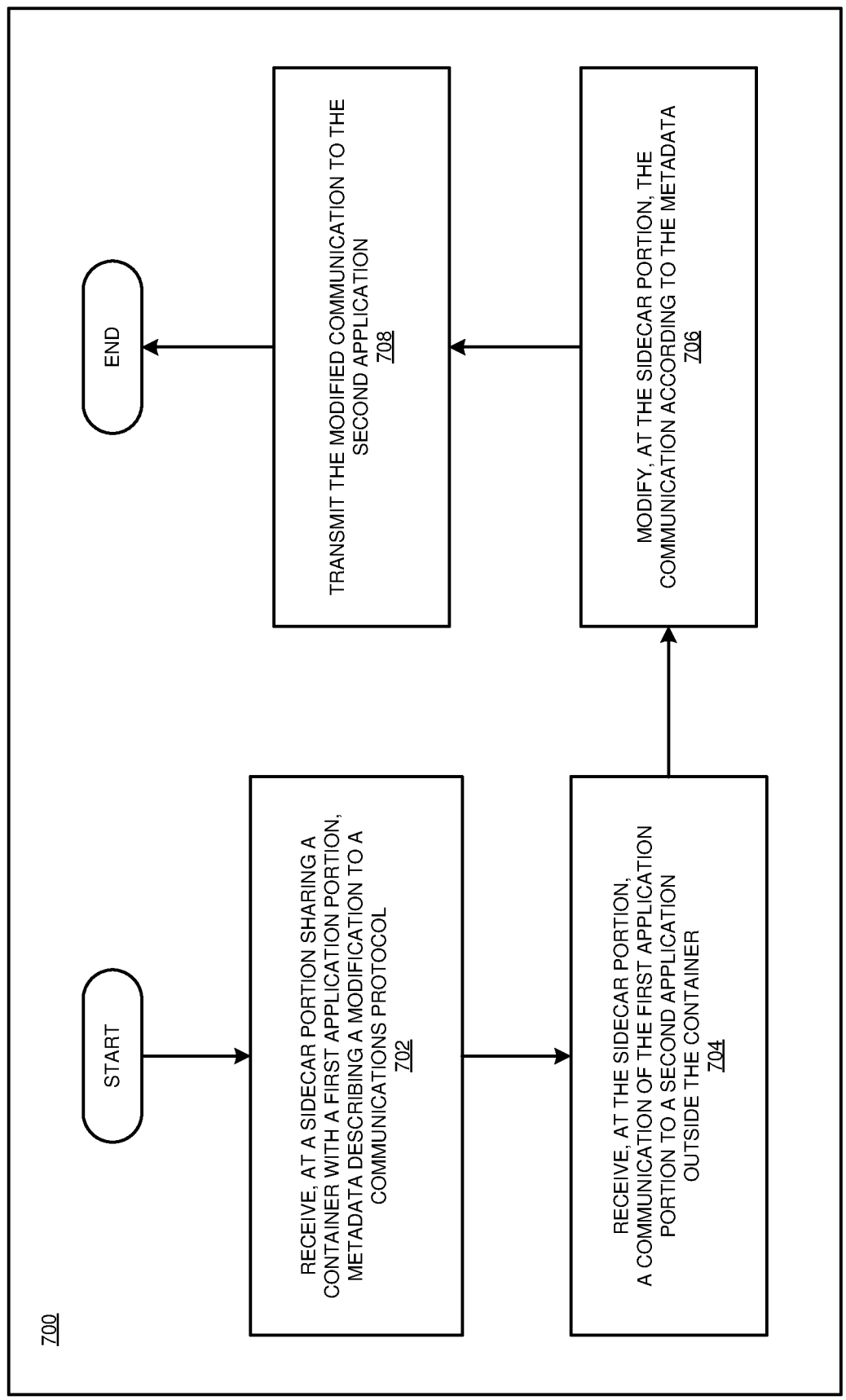
FIG. 7 depicts a flowchart of an example process for run-time communications protocol parameter adjustment in containerized applications in accordance with an illustrative embodiment.

With reference to FIG. 7, this figure depicts a flowchart of an example process for run-time communications protocol parameter adjustment in containerized applications in accordance with an illustrative embodiment. Process 800 can be implemented in application 300 in FIG. 3.

In block 702, the application receives, at a sidecar portion sharing a container with a first application portion, metadata describing a modification to a communications protocol. In block 704, the application receives, at the sidecar portion, a communication of the first application portion to a second application outside the container. In block 706, the application modifies, at the sidecar portion, the communication according to the metadata. In block 708, the application transmits the modified communication to the second application. Then the application ends.

Figure 8:
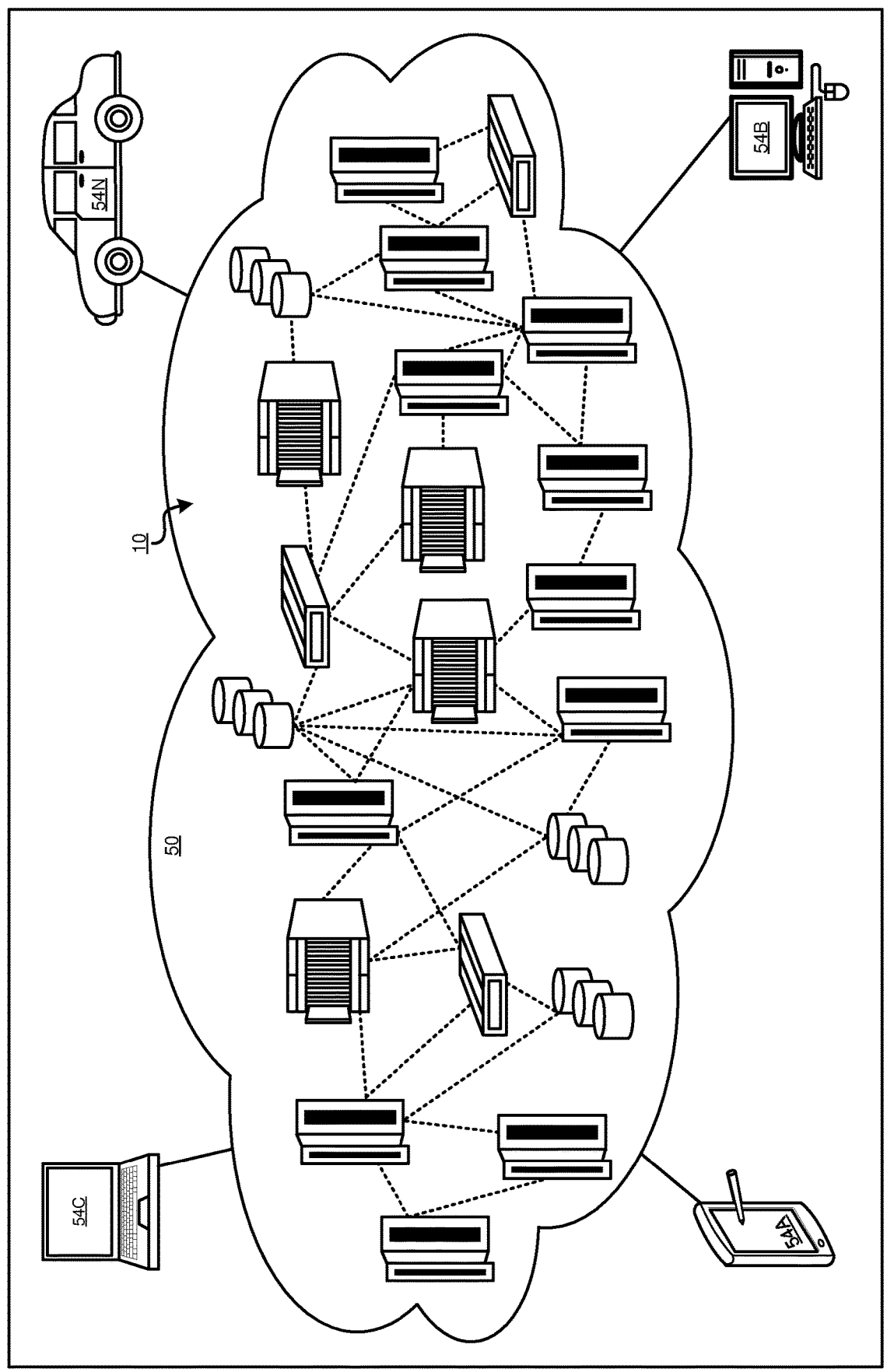
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
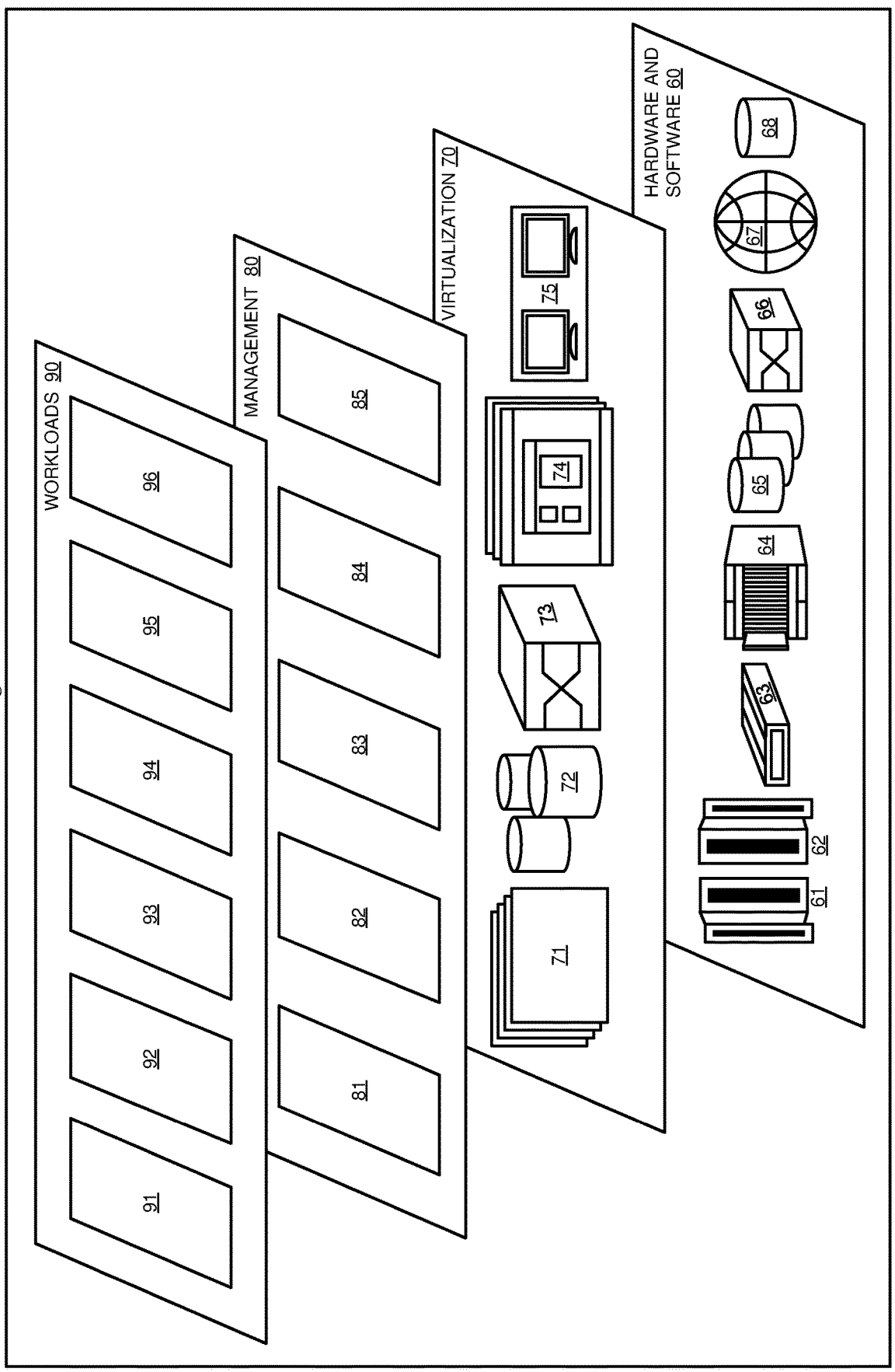
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for run-time communications protocol parameter adjustment in containerized applications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, at a sidecar portion sharing a container with a first application portion, metadata specifying a modification to be performed on a header portion of a communication;
   modifying, at the sidecar portion, a header portion of a communication of the first application portion to a second application outside the container, the modifying performed according to the metadata, the modifying resulting in a modified communication; and
   transmitting, to the second application, the modified communication.

2. The computer-implemented method of claim 1, wherein the metadata implements a security policy.

3. The computer-implemented method of claim 1, wherein the sidecar portion comprises a communications interface between the first application portion and the second application.

4. The computer-implemented method of claim 1, wherein the modifying comprises replacing the header portion of the communication with a second header portion.

5. The computer-implemented method of claim 1, wherein the modifying comprises modifying a setting specified in the header portion of the communication.

6. The computer-implemented method of claim 1, wherein the modifying comprises adding a second header portion to the communication.

7. A computer program product for communications protocol parameter adjustment, the computer program product comprising:
   one or more computer readable storage media, and program instructions collectively stored on the one or more computer readable storage media, the program instructions comprising:
   program instructions to receive, at a sidecar portion sharing a container with a first application portion, metadata specifying a modification to be performed on a header portion of a communication;
   program instructions to modify, at the sidecar portion, a header portion of a communication of the first application portion to a second application outside the container, the modifying performed according to the metadata, the modifying resulting in a modified communication; and
   program instructions to transmit, to the second application, the modified communication.

8. The computer program product of claim 7, wherein the metadata implements a security policy.

9. The computer program product of claim 7, wherein the sidecar portion comprises a communications interface between the first application portion and the second application.

10. The computer program product of claim 7, wherein the modifying comprises replacing the header portion of the communication with a second header portion.

11. The computer program product of claim 7, wherein the modifying comprises modifying a setting specified in the header portion of the communication.

12. The computer program product of claim 7, wherein the modifying comprises adding a second header portion to the communication.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising:
   one or more hardware processors;
   one or more computer-readable memories;
   and one or more computer-readable storage devices;
   and program instructions stored on at least one of the one or more storage devices for execution by at least one of the one or more processors via at least one of the one or more memories, the stored program instructions when executed by a hardware processor in the one or more hardware processors causing operations comprising:
   receiving, at a sidecar portion sharing a container with a first application portion, metadata specifying a modification to be performed on a header portion of a communication;
   modifying, at the sidecar portion, a header portion of a communication of the first application portion to a second application outside the container, the modifying performed according to the metadata, the modifying resulting in a modified communication; and
   transmitting, to the second application, the modified communication.

17. The computer system of claim 16, wherein the metadata implements a security policy.

18. The computer system of claim 16, wherein the sidecar portion comprises a communications interface between the first application portion and the second application.

19. The computer system of claim 16, wherein the modifying comprises replacing the header portion of the communication with a second header portion.

20. The computer system of claim 16, wherein the modifying comprises modifying a setting specified in the header portion of the communication.

\* \* \* \* \*